US011218902B2

(12) United States Patent
Lee et al.

(10) Patent No.: US 11,218,902 B2
(45) Date of Patent: Jan. 4, 2022

(54) METHOD AND APPARATUS FOR CONFIGURING QOS FLOW IN WIRELESS COMMUNICATION SYSTEM

(71) Applicant: Samsung Electronics Co., Ltd., Gyeonggi-do (KR)

(72) Inventors: Hyungho Lee, Seoul (KR); Kisuk Kweon, Gyeonggi-do (KR); Sangjun Moon, Seoul (KR); Jungshin Park, Seoul (KR); Beomsik Bae, Gyeonggi-do (KR); Jicheol Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/685,422

(22) Filed: Nov. 15, 2019

(65) Prior Publication Data

US 2020/0084657 A1 Mar. 12, 2020

Related U.S. Application Data

(63) Continuation of application No. 15/974,138, filed on May 8, 2018, now Pat. No. 10,492,096.

(30) Foreign Application Priority Data

May 8, 2017 (KR) .................. 10-2017-0057434

(51) Int. Cl.
*H04L 12/851* (2013.01)
*H04W 28/02* (2009.01)
(Continued)

(52) U.S. Cl.
CPC ..... *H04W 28/0268* (2013.01); *H04L 47/2408* (2013.01); *H04L 47/2425* (2013.01);
(Continued)

(58) Field of Classification Search
CPC .......... H04L 47/2408; H04L 47/2425; H04W 28/0263; H04W 28/0268; H04W 4/70; H04W 80/06
See application file for complete search history.

(56) References Cited

U.S. PATENT DOCUMENTS

| 2007/0014256 A1* | 1/2007 | Le Faucheur | ......... H04W 76/12 370/328 |
| 2014/0233380 A1* | 8/2014 | Kim | ........................ H04L 47/24 370/230 |

(Continued)

FOREIGN PATENT DOCUMENTS

WO WO 2018/202205 11/2018

OTHER PUBLICATIONS

Qualcomm Incorporated, "Further Consideration of SDAP Header", R2-1705058, 3GPP TSG-RAN WG2 Meeting #98, May 15-19, 2017, 2 pages.

(Continued)

*Primary Examiner* — Minh Trang T Nguyen
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to a method and an apparatus for configuring a QoS flow in a mobile communication system.

18 Claims, 12 Drawing Sheets

(51) Int. Cl.
*H04W 80/06* (2009.01)
*H04W 4/70* (2018.01)

(52) U.S. Cl.
CPC .......... *H04W 28/0263* (2013.01); *H04W 4/70* (2018.02); *H04W 80/06* (2013.01)

(56) References Cited

U.S. PATENT DOCUMENTS

| | | | |
|---|---|---|---|
| 2015/0222549 | A1 | 8/2015 | Kakadia et al. |
| 2017/0317894 | A1* | 11/2017 | Dao .................... H04W 28/24 |
| 2017/0359749 | A1 | 12/2017 | Dao |
| 2018/0270697 | A1 | 9/2018 | Turtinen |
| 2018/0324631 | A1 | 11/2018 | Jheng |
| 2019/0150023 | A1 | 5/2019 | Cho |

OTHER PUBLICATIONS

Ericsson, "QoS and SDAP Layer Aspects in NR", R2-1705116, 3GPP TSG-RAN WG2 #98, May 15-19, 2017, 4 pages.
European Search Report dated Mar. 12, 2020 issued in counterpart application No. 18797747.5-1212, 14 pages.
3GPP, 3rd Generation Partnership Project; Technical Specification Group Services and System Aspects; System Architecture for the 5G System; Stage 2 (Release 15), 3GPP TS 23.501 V0.4.0, Apr. 2017, 124 pages.
LG Electronics, "TS 23.501: Update of Clause 5.7.2 the Reflective QoS—Reflective QoS Indication Provided by a UE", S2-170842, SA WG2 Meeting #119, Feb. 13-17, 2017, 3 pgs.
LG Electronics, "TS 23.502: Update of Session Establishment Procedure for LBO—Including the Reflective QoS Aspects", S2-172115, SA WG2 Meeting #120, Mar. 27-31, 2017, 5 pgs.
Applied Communication Sciences, OEC, AT&T, "DSCP Assignments for Priority Traffic", S2-170156, SA WG2 Meeting #118-bis, Jan. 16-20, 2017, 5 pages.
International Search Report dated Aug. 23, 2018 issued in counterpart application No. PCT/KR2018/005285, 3 pages.
Vodafone Group, The QoS Architecture of LTE, "Vodafone Group", R2-060961, 3GPP TSG RAN WG2 #52, Apr. 27-31, 2006, 5 pages.
Samsung, "Transport Level Packet Marking in 5G System", S2-170336, SA WG2 Meeting #118-BIS, Jan. 16-20, 2017, 2 pages.
Intel Corporation, "TP from [97bis#15][NR] QoS message Flows", R2-1704805, 3GPP TSG-RAN WG2 Meeting #98, May 15-19, 2017, 5 pages.
European Search Report dated Aug. 27, 2021 issued in counterpart application No. 21178592.8-1212, 13 pages.
Japanese Office Action dated Nov. 8, 2021 issued in counterpart application No. 2019-560370, 9 pages.

* cited by examiner

FIG. 5

| Information Element | Type/Reference |
|---|---|
| 502 — QoS Rule ID | Integer type |
| 504 — QoS Flow ID (QFI) | Integer type |
| 506 — QoS Flow Template | One or plural packet filters |
| 508 — Precedence Value | Integer type |
| 510 — 5G QoS Characteristic Indication (5QI) | Integer type |
| 512 — QoS parameters | - Flow type: Selection type [one of GBR/non-GBR]<br>- Priority: Value (number) type<br>- Packet delay budget: msec value type<br>- Packet error rate: Value type between 0 and 1<br>- Guaranteed flow bit rate: bps value type<br>- Maximum flow bit rate: bps value type |
| 514 — Reflective QoS Support | - Selection type (one of nonsupport/reflective QoS via control plane/reflective QoS via user plane) |

FIG. 6

| Information Element | Type/Reference |
|---|---|
| 602 — QoS Profile ID | Integer type |
| 604 — QoS Flow ID (QFI) | Integer type |
| 606 — 5G QoS Characteristic Indication (5QI) | Integer type |
| 608 — QoS parameters | - Flow type: Selection type [one of GBR/non-GBR]<br>- Priority: Value (number) type<br>- Packet delay budget: msec value type<br>- Packet error rate: Value type between 0 and 1<br>- Guaranteed flow bit rate: bps value type<br>- Maximum flow bit rate: bps value type |
| 610 — Reflective QoS Support | - Selection type (one of nonsupport / support [RQI bit over Uu required]) |
| 612 — Transport level packet marking | Transport level packet marking value for Uplink, which can be DSCP value, MPLS TOS value |

| Information Element | Type/Reference |
|---|---|
| 702 — QoS Profile ID | Integer type |
| 704 — QoS Flow ID (QFI) | Integer type |
| 706 — QoS Flow Template | One or plural packet filters |
| 708 — Precedence Value | Integer type |
| 710 — 5G QoS Characteristic Indication (5QI) | Integer type |
| 712 — QoS parameters | - Flow type: Selection type [one of GBR/non-GBR]<br>- Priority: Value (number) type<br>- Packet delay budget: msec value type<br>- Packet error rate: Value type between 0 and 1<br>- Guaranteed flow bit rate: bps value type<br>- Maximum flow bit rate: bps value type |
| 714 — Transport level packet marking | Transport level packet marking value for Downlink, which can be DSCP value, MPLS TOS value |

METHOD AND APPARATUS FOR CONFIGURING QOS FLOW IN WIRELESS COMMUNICATION SYSTEM

CROSS-REFERENCE TO RELATED APPLICATION(S)

This application is a Continuation of U.S. Ser. No. 15/974,138, which was filed in the U.S. Patent and Trademark Office on May 8, 2018, and claims priority under 35 U.S.C. § 119(a) to Korean Patent Application Serial No. 10-2017-0057434, which was filed in the Korean Intellectual Property Office on May 8, 2017, the entire disclosure of each of which is incorporated herein by reference.

BACKGROUND

1. Field

The disclosure relates, generally, to an electronic device, and more particularly, to an electronic device that uses a method for configuring a quality of service (QoS) flow in a mobile communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

On the other hand, in order to satisfy various QoS requirements of OTT, a 5G system uses reflective QoS, flexible QoS, and non-standardized QoS class, which are new features. Further, for QoS differentiation in a backhaul portion, the 5G system uses transport level marking that has also been used in LTE.

SUMMARY

The present disclosure has been made to address at least the disadvantages described above and to provide at least the advantages described below.

In accordance with an aspect of the disclosure, there is provided a method performed by a base station in a wireless communication system. The method includes receiving, from a session management function (SMF) entity, information on transport level packet marking for uplink data of a terminal; receiving, from the terminal, the uplink data; performing the transport level packet marking in an internet protocol (IP) header for the uplink data based on the information; and transmitting, to a user plane function (UPF) entity, the uplink data with the IP header.

In accordance with an aspect of the disclosure, there is provided a method performed by a user plane function (UPF) entity in a wireless communication system. The method includes receiving, from a session management function (SMF) entity, information on transport level packet marking for downlink data for a terminal; performing the transport level packet marking in an internet protocol (IP) header for the downlink data based on the information; and transmitting, to a base station, the downlink data with the IP header.

In accordance with an aspect of the disclosure, there is provided a base station in a wireless communication system. The base station includes a transceiver; and a controller coupled with the transceiver and configured to receive, from a session management function (SMF) entity, information on transport level packet marking for uplink data of a terminal, receive, from the terminal, the uplink data, perform the transport level packet marking in an internet protocol (IP) header for the uplink data based on the information, and transmit, to a user plane function (UPF) entity, the uplink data with the IP header.

In accordance with an aspect of the disclosure, there is provided a user plane function (UPF) entity in a wireless communication system. The UPF entity includes a transceiver; and a controller coupled with the transceiver and configured to receive, from a session management function (SMF) entity, information on transport level packet marking for downlink data for a terminal, perform the transport level packet marking in an internet protocol (IP) header for the downlink data based on the information, and transmit, to a base station, the downlink data with the IP Header.

In accordance with an aspect of the disclosure, there is provided a method performed by a terminal in a wireless communication system. The method includes generating uplink data of the terminal; and transmitting, to a base station, the uplink data. Information on transport level packet marking for the uplink data is received by the base station from a session management function (SMF) entity. The transport level packet marking is performed by the base station in an internet protocol (IP) header for the uplink data based on the information. The uplink data with the IP header is transmitted by the base station to a user plane function (UPF) entity.

In accordance with an aspect of the disclosure, there is provided a terminal in a wireless communication system. The terminal includes a transceiver; and a controller coupled with the transceiver and configured to generate uplink data of the terminal, and transmit, to a base station, the uplink data. Information on transport level packet marking for the uplink data is received by the base station from a session management function (SMF) entity. The transport level packet marking is performed by the base station in an internet protocol (IP) header for the uplink data based on the information. The uplink data with the IP header is transmitted by the base station to a user plane function (UPF) entity.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 5 is a diagram of a QoS rule that applies for a session management function (SMF) that transfers to a user equipment (UE), according to an embodiment;

FIG. 6 is a diagram explaining a QoS profile that applies for an SMF that transfers to a RAN, according to an embodiment;

FIG. 7 is a diagram explaining a QoS rule that an SMF transfers to a user plane function (UPF), according to an embodiment;

DETAILED DESCRIPTION

Figure 1:
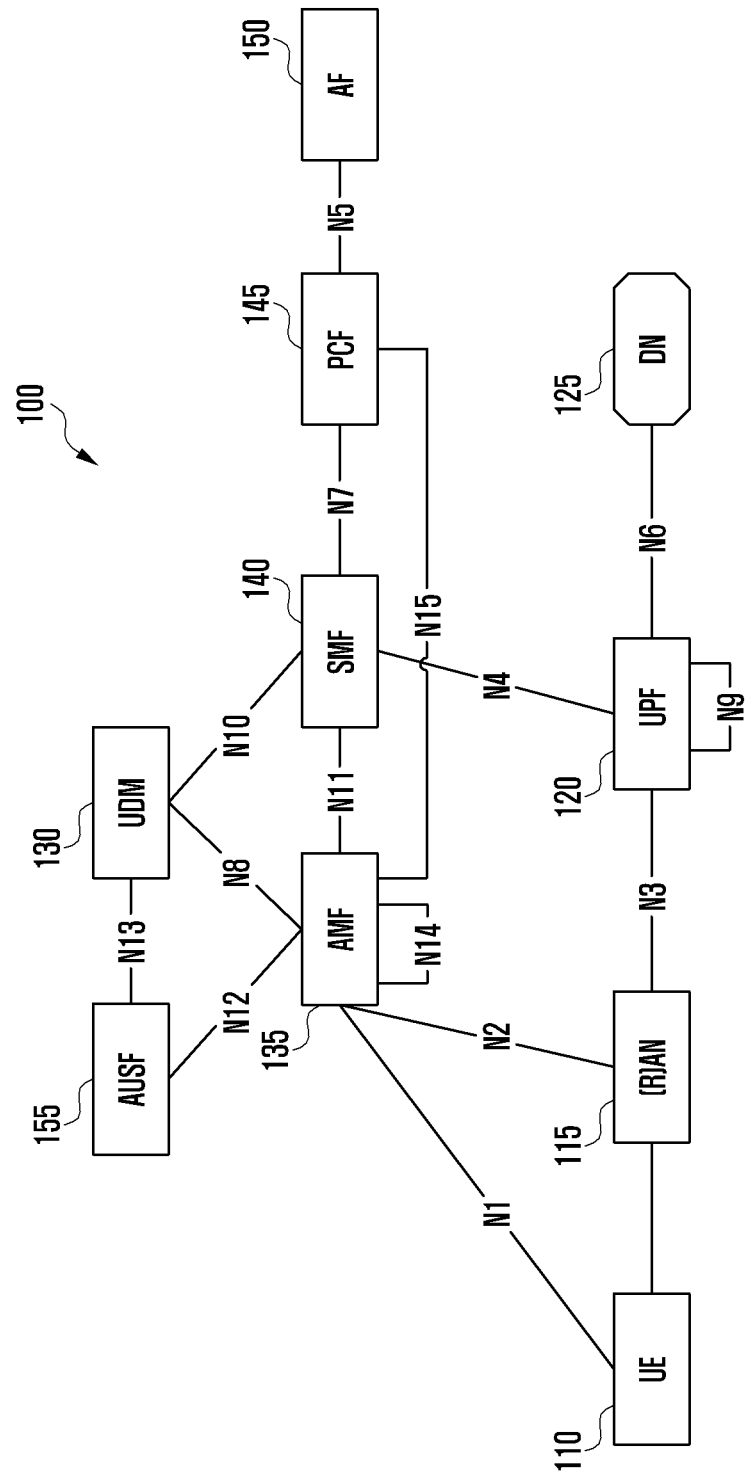
FIG. 1 is a diagram of a 5G system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

In accordance with the disclosure, a method and an apparatus for configuring a QoS flow is now herein described in detail with reference to the accompanying drawings.

FIG. 1 is a diagram of a 5G system, according to an embodiment.

Referring to FIG. 1, a 5G system may include a terminal (user equipment (UE)) 110, a RAN 115, a UPF 120, a data network (DN) 125, a user data management (UDM) 130, an access & mobility function (AMF) 135, a session management function (SMF) 140, a policy control function (PCF) 145, an application function (AF) 150, and an authentication server function (AUSF) 155.

The 5G system uses reflective QoS, flexible QoS, and non-standardized QoS class in order to satisfy various QoS requirements of OTT. Further, the 5G system uses transport level marking that has also been used in LTE for QoS differentiation in a backhaul portion.

Figure 2:
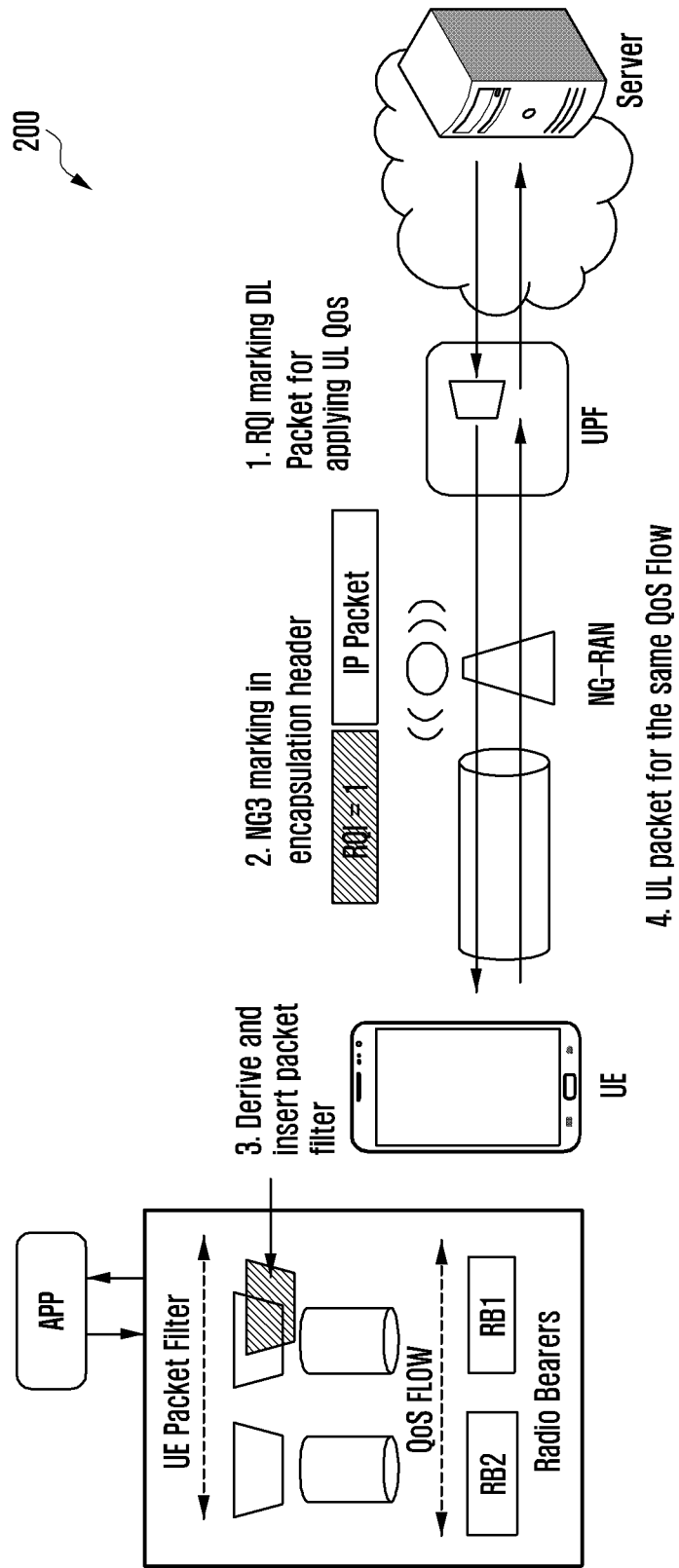
FIG. 2 is a diagram of reflective QoS, according to an embodiment.

FIG. 2 is a diagram of reflective QoS, according to an embodiment.

1) RQ

The RQ is a scheme for the UE to generate a UL QoS rule based on a received downlink data packet. In one PDU session, both a QoS flow using the RQ and a QoS flow that does not use the RQ may exist.

There are two kinds of RQ activation schemes.

Reflective QoS Activation Via User Plane

If the UPF 120 receives a packet of an internet protocol (IP) flow corresponding to a QoS rule intended to be changed from an external DN, the UPF 120 configures a reflective QoS indication (RQI) field to 1 in an encapsulation header of the received DL packet, and transfers the DL packet with the configured RQI field to an N3 interface. The UE 110 having received the DL packet with the configured RQI field makes the QoS rule for UL using an IP and a transmission control protocol (TCP) of the received DL packet or UDP header information.

Reflective QoS Activation Via Control Plane

If the UE 110 receives the QoS rule including the RQI from the SMF 140 and receives the DL packet matching the QoS rule, the UE 110 generates the UL QoS rule from the received DL packet.

2) Flexible QoS

As compared with the LTE in which the relationship between an evolved packet system (EPS) bearer that is a QoS unit and a data radio bearer (DRB) is 1:1, in the 5G system, the relationship between the QoS flow and the DRB can be n:1 (n≥1). For example, if a plurality of QoS flows satisfy the QoS requirements, a 5G base station (RAN 115) can transfer the packet to the UE 110 using one DRB. The RAN 115 determines and connects the DRB relationship of the QoS flows, but a 5G system center network (5G core network (5GC)) is unable to know the connection relationship.

3) Non-Standardized QoS Class

As compared with the LTE in which only a determined QoS class is supported, in the 5G system, the QoS class can be defined without limit. For this, two kinds of 5G QoS indicators (5Qis) are used in the 5G system.

Standardized 5QI

The QoS characteristics called by the standardized 5QI, that is, resource type, priority level, packet delay budget (PDB), and packet error rate (PER), are preconfigured in devices of the 5G system. The PF 120, UE 110, and RAN 115, and thus the QoS characteristics can be known only by the 5QI without separate signaling.

Non-Standardized 5QI

As needed, the QoS characteristics called by the non-standardized 5QI are dynamically determined by the 5GC, and the determined QoS characteristics, together with the 5QI, are transferred to the devices of the 5G system.

If the non-standardized 5QI is used, the QoS class can be freely defined in addition to the predetermined QoS class in the 5G system.

4) Transport Level Packet Marking

In the LTE, transport level marking is used for QoS differentiation in a backhaul network (network for data transmission between a primary gateway (P-GW) and an evolved-node B (eNB). The transport level marking is a gateway (GW) and an eNB in the LTE perform QoS differentiation marking in L3 or L2 layer header of the backhaul network based on QoS class index (QCI) and ARP of the LTE. For example, the GW or eNB marks a suitable value in a differentiated services code point (hereinafter, DSCP) field of an outer IP header in consideration of the QCI and address resolution protocol (ARP) of the EPS bearer. Even in the 5G system, the RAN 115 and the UPF 120 perform transport level packet marking to provide the QoS in the backhaul network.

However, in accordance with the use of the reflective QoS, the computation load of the DL packet of the UE 110 may be increased. The detection load of per packet inspection and new IP flow may be increased, and the computation load of the packet of the terminal to be computed per hour in accordance with the 5G speed improvement may be increased. With regard to each header for transferring QoS information to the UE 110, a new header is used in a radio section to transfer QoS flow ID (QFI) and reflective QoS indication (RQI), and when the transfer of the QFI and the RQI is not necessary, the waste of the radio resources occurs (e.g., IoT device). There may be a need for schemes to provide a QoS in a backhaul portion in the 5G system. In order to ease the support of the new QoS class in the 5G, non-standardized 5QI becomes possible, and it may be difficult to preconfigure the 5QI and the DSCP mapping.

In order to solve the problem of the computation load of a DL packet of a terminal that is increased due to the use of the reflective QoS, the disclosure can provide transfer of an RQ support/nonsupport of the UE 110 and an RQ type, determination of an RQ support/nonsupport of a CN for each QoS flow and a support type in consideration of the RQ support/nonsupport of the UE and QoS requirements, transfer the RQ support/nonsupport of the core network (CN) for each QoS flow to the UE 110 and an RQ type, and DL packet computation differentiation in accordance with the RQ support/nonsupport of the QoS flow of the UE 110 and the support type.

In order to solve the problem of the occurrence of the waste of the radio resources, the disclosure can transfer an RQ support/nonsupport of the core network (CN) for each QoS flow to the RAN 115, QoS flow to DRB mapping in accordance with the RQ support/nonsupport of the QoS flow of the RAN 115 and the RQ type, and RQ support header configuration of the DRB in accordance with the RQ support/nonsupport of the QoS flow of the RAN 115 and the RQ type.

Further, in a backhaul portion to be provided in the 5G system, the disclosure can provide determination of the transport level marking value during generation of the QoS flow in consideration of the QoS requirements of the CN and the N3 path situation between the UPF 120 and the RAN 115 and transfer the transport level marking value for each QoS flow to the CN UPF 120 and RAN 115.

First Embodiment—PDU Session Establishment Procedure

Figure 3:
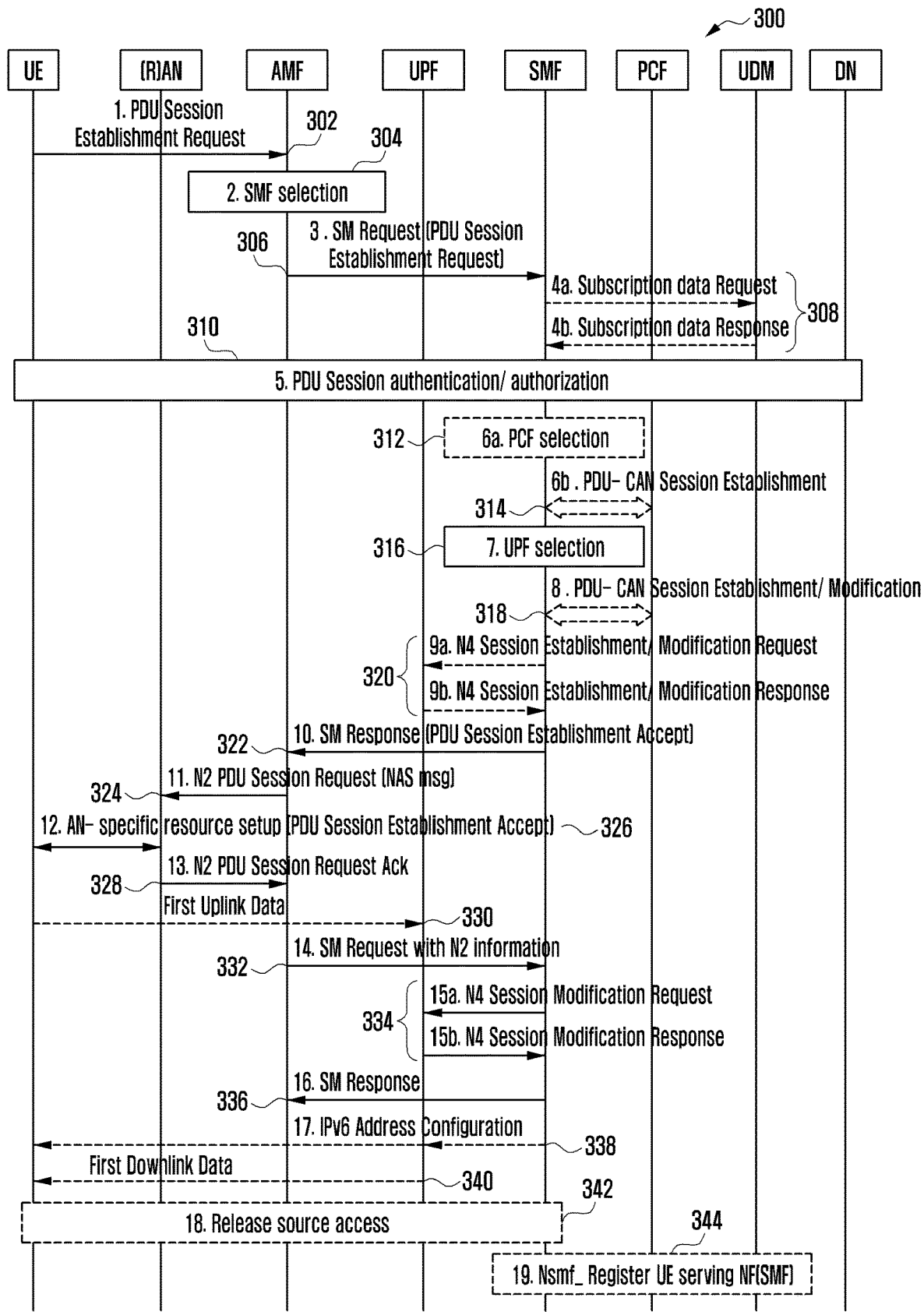
FIG. 3 is a flowchart of a method of for a protocol data unit (PDU) session establishment procedure, according to an embodiment.

FIG. 3 is a flowchart of a method of for a PDU session establishment procedure, according to an embodiment.

1. [UE→AMF] Session establishment is requested by transferring a session establishment request. The session establishment request includes RQ types that can be supported by the UE (302). The RQ types may include RQ nonsupport, RQ via control plane (RQ via C or RQvC) support only (RQvC only), RQ via user plane (RQ via U or RQvU) support only (RQvU only), and both RQ via C and RQ via U supportable (RQvCvU).

2. (AMF) An AMF selects an SMF (304).

3. [AMF→SMF] A PDU session establish request is transferred to the SMF selected in procedure 2 (306).

4. [SMF→WDM] The SMF requests and receives UE subscription information from a UDM (308).

5. PDU session authentication procedure (310).

6. (SMF) The SMF can select a PCF. In this case, the SMF can receive a QoS policy to be used by the UE from the PCF (312 and 314).

7. (SMF) The SMF selects a UPF to be used by a session between the UE and a DN (316).

8. (SMF→PCF) The SMF can receive a QoS policy rule to be used by the UE from the PCF (318). The SMF determines items of [Third Embodiment] and [Fourth Embodiment] in consideration of RQ support/nonsupport of the UE in procedure 1 and an RQ type and the QoS policy of the PCF in procedure 6.

UL and DL transport level packet marking of [Fourth Embodiment] and [Fifth Embodiment] is determined in consideration of the QoS policy of the PCF in procedure 6 and a backhaul state between the UPF and a RAN.

9. (SMF→UPF) If the session establishment has been performed in procedure 5, the SMF sends an N4 session modification request to the UPF. The N4 session modification request includes [Fifth Embodiment] determined in procedure 8 (320).

10. (SMF→AMF) The SMF transfers an SM response to the AMF. The SM response may include the followings: Cause, N2 SM information, and N1 SM information. The N2 SM information includes a PDU session ID, QoS Profile(s), and CN Tunnel Info. The N1 SM information includes a PDU session establishment accept (authorized QoS rule, SSC(Session and Service Continuity) mode, S-NSSAI (single network slice selection assistance information), and allocated IPv4 address) (322).

The QoS Profile includes [Fourth Embodiment] of QoS flows to be used for a RAN session.

The authorized QoS rule includes [Third Embodiment] of QoS flows to be used for a UE session.

11. (AMF→RAN) The AMF transfers an N2 PDU session request to the RAN. The AMF transfers to the RAN a NAS message including the PDU session ID and the PDU session establishment accept (324).

12. (RAN→UE) The RAN configures a DRB as in [Sixth Embodiment] (326).

The RAN transfers to the UE the NAS message (PDU session ID, N1 SM information (PDU session establishment accept)) received in procedure 11.

13. (RAN→AMF) Response to a request in procedure 11 (328).

14. (AMF→SMF) The SM request (N2 SM information) is transferred (332).

15. (SMF→UPF) If the PDU session has not been made, the SMF transfers an N4 session establishment message to the UPF to request the UPF to generate the PDU session, whereas if the PDU session has been made, the SMF transfers an N4 session modification to request the UPF to change the PDU session (334).

The N4 session establishment and the N4 session modification include [Fifth Embodiment].

16. (SMF→AMF) Response in procedure 14 (336).

17. (SMF→UE) IPv6 configuration information can be transferred (338).

18. If the PDU session establishment is a handover from non-3GPP access to 3GPP access, the session in the non-3GPP access is released (342).

19. The UDM stores SMF id, SMF address, and DNN (344).

Second Embodiment—PDU Session Modification Procedure

Figure 4:
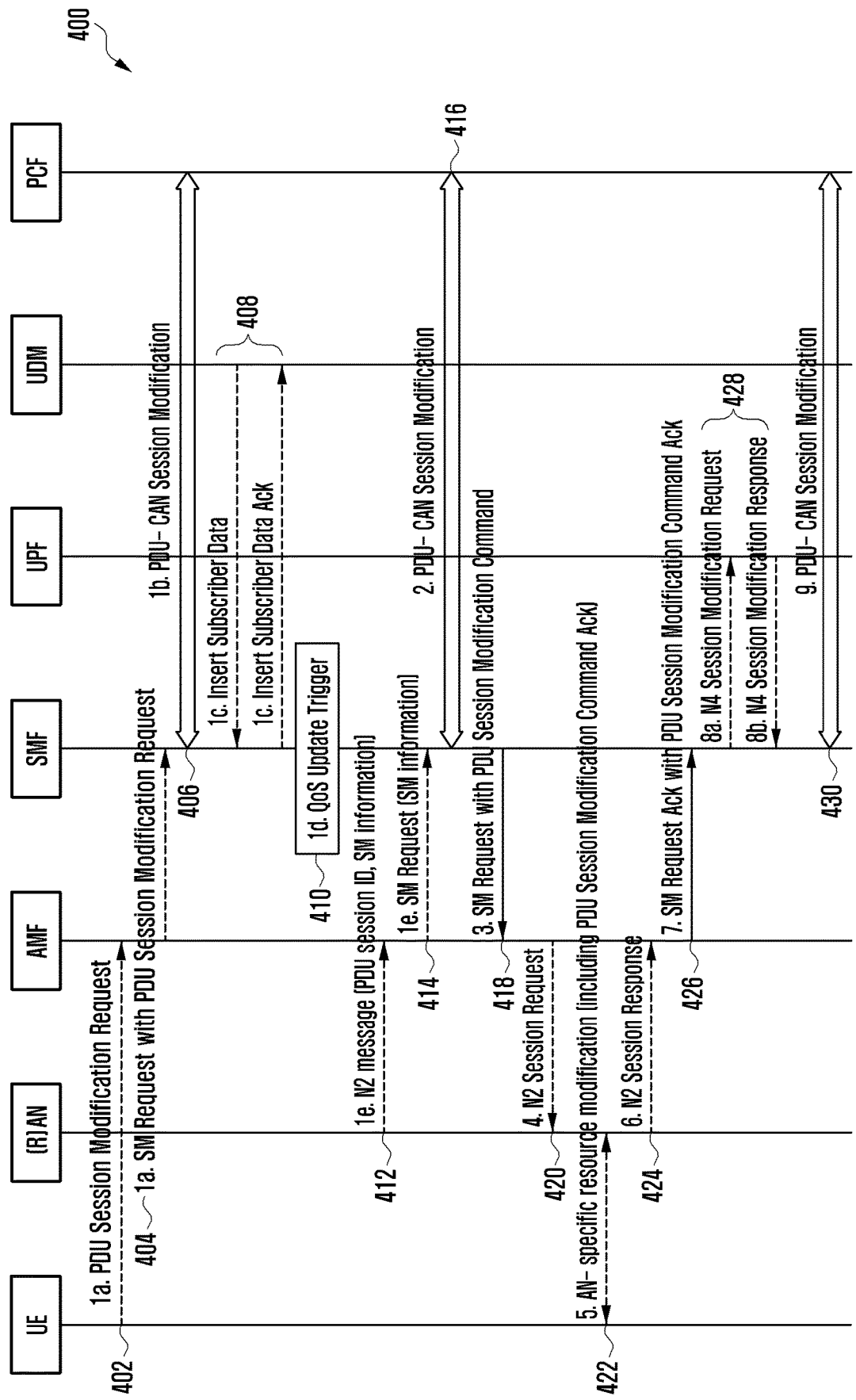
FIG. 4 is a flowchart of a PDU session modification procedure, according to an embodiment.

FIG. 4 is a flowchart of a PDU session modification procedure, according to an embodiment.

1. Start of the procedure may be as follows.
A. UE initiates the PDU session modification procedure through transmission of a PDU session modification over N1 (402).
B. A PCF initiates a PDU-CAN session modification procedure upon policy decision triggered by DPI's traffic detection notification or upon AF requests (404 and 406).
C. A UDM sends an insert subscriber data message to an SMF (408).
D. The SMF may decide to modify a PDU session. This procedure may also be triggered based on a locally configured policy (410).
E. A (R)AN sends an N2 message (PDU session ID and SM information) to an AMF. The SM information includes a QFI and a notification indicating that QoS targets cannot be fulfilled. The AMF sends an SM request (SM information) message to the SMF (412 and 414).

2. (SMF→PCF) The SMF requests a changed QoS policy from the PCF, and the PCF transfers the changed QoS policy to the SMF. The SMF determines items of [Third Embodiment] and [Fourth Embodiment] in consideration of RQ support/nonsupport of the UE in procedure 1 of [First Embodiment] and an RQ type and the QoS policy of the PCF (416).

UL and DL transport level packet marking of [Fourth Embodiment] and [Fifth Embodiment] is determined in consideration of the QoS policy of the PCF and a backhaul state between the UPF and a RAN.

3. (SMF→AMF) The SMF transfers to the AMF an SM request message (N2 SM information (PDU session ID, QoS profile, and session-AMBR), N1 SM container (PDU session modification command (PDU session ID, QoS rule, and session-AMBR))) (418).

The N2 SM information includes a PDU Session ID, QoS Profile(s), and a session AMBR.

The N1 SM information includes a PDU session modification command (PDU session id, QoS Rule, and session AMBR).

The QoS profile includes [Fourth Embodiment] of QoS flows to be used for a RAN session.

The authorized QoS rule includes [Third Embodiment] QoS flows to be used for a UE session.

4. (AMF→RAN) The AMF transfers an N2 PDU session request message to the RAN (420).

The N2 PDU session request includes N2 SM information in procedure 3.

A NAS message includes a PDU session modification command in procedure 3.

5. (RAN→UE) DRB configuration change of the RAN (422).

The NAS message in procedure 4 is transferred to the UE.

DRB configuration may be changed in accordance with the N2 SM information transferred in procedure 3. In this case, the DRB configuration can be performed as in [Sixth Embodiment].

6. (RAN→AMF) Response in procedure 4 (424).

7. (AMF→SMF) Response in procedure 3 (426).

8. (SMF→UPF) The SMF may request a PDU session change by transferring an N4 session modification to the UPF (428).

The N4 session modification includes [Fifth Embodiment].

9. (SMF→PCF) The SMF may notify the PCF that the QoS policy has been configured (430).

Third Embodiment—QoS Rule that the SMF Transfers to the UE

The SMF transfers to the UE a QoS rule to be used during UL traffic discrimination and QoS security. FIG. 5 is a diagram of a QoS rule that applies for an SMF that transfers to a UE, according to an embodiment. The QoS rule transferred to the UE may include the following contents.

QoS rule ID (502): Identification number for discriminating the QoS rule configured in the UE during control of the QoS Rule.

QoS flow ID (QFI) (504): Identification number marked on a DL packet to be transferred to the UE in order to discriminate the QoS flow indicated by this QoS rule, or marked by the UE on a UL packet for the QoS process of a UL traffic. When using the standard designation 5QI, the QFI may have the same value as the value of the 5QI.

QoS flow template (506): A set of packet filters for applying the UL traffic during selection of the QoS flow corresponding to the QoS rule; this may be omitted if a default QoS rule or reflective QoS is supported.

Precedence value (508): The order of applying this QoS rule to the UL traffic.

5G QoS characteristic indication (5QI) (510): An identifier indicating the QoS processing characteristic received when the QoS flow indicated by the QoS rule is processed in the 5G system. The 5QI may have a value designated in the standard or a value optionally selected by the SMF. With respect to the standard designated value, the 5QI may be omitted.

QoS parameters (512): Parameters required for the QoS processing characteristic of the QoS flow indicated by this QoS rule. The parameters may be a flow type, priority level, packet delay budge, packet error rate, guaranteed flow bit rate, maximum flow bit rate, and notification control. One or more of the QoS parameters may be omitted if they already known to the UE.

Reflective QoS support (514): Reflective QoS type supported by the QoS flow indicated by this QoS Rule. The Reflective QoS type may be nonsupport/reflective QoS via control plane and/or reflective QoS via user plane.

Fourth Embodiment—QoS Profile that the SMF Transfers to the RAN

The SMF transfers to the RAN a QoS profile indicating the QoS characteristic to be used during QoS security of DL and UL traffic.

FIG. 6 is a diagram explaining a QoS profile that applies for an SMF that transfers to a RAN, according to an embodiment. The QoS profile transferred to the RAN may include the following contents.

QoS rule ID (602): Identification number for discriminating the QoS rule configured in the UE during control of the QoS Rule.

QoS flow ID (QFI) (604): Identification number marked on a DL packet to be transferred to the UE in order to discriminate the QoS flow indicated by this QoS rule, or marked by the UE on a UL packet for the QoS process of a UL traffic.

5G QoS characteristic indication (5QI) (606): An identifier indicating the QoS processing characteristic received when the QoS flow indicated by this QoS rule is processed in the 5G system. The 5QI may have a value designated in the standard or a value optionally selected by the SMF. With respect to the standard designated value, the 5QI may be omitted.

QoS parameters (608): Parameters required for the QoS processing characteristic of the QoS flow indicated by this QoS rule. The parameters may be a flow type, priority level, packet delay budge, packet error rate, guaranteed flow bit rate, maximum flow bit rate, and notification control. One or more of the QoS parameters may be omitted when they are already known to the UE (e.g., during the use of the standard designation 5QI).

Reflective QoS support (610): Reflective QoS type supported by the QoS flow indicated by this QoS Rule. It may be one of nonsupport/reflective QoS via control plane and reflective QoS via user plane.

Transport level packet marking (612): Transport level packet marking in the uplink, e.g., DiffSery code point (DSCP), to be applied for the traffic identified for this QoS Flow, which can be DSCP value and/or MPLS (Multiprotocol Label Switching) TOS (Type of Service) value. The transport level packet marking may be determined in consideration of the QoS characteristic, ARP, and backhaul state between the UPF and the RAN (expected congestion level and expected round trip time (RTT) between the UPF and the RAN).

Fifth Embodiment—QoS Rule that the SMF Transfers to the UPF

The SMF transfers to the UPF a QoS rule to be used during DL traffic discrimination and QoS security. FIG. 7 is a diagram explaining a QoS rule that an SMF transfers to a user plane function (UPF) according to an embodiment of the present disclosure. The QoS rule transferred to the UPF may include the following contents.

QoS rule ID (702): Identification number for discriminating the QoS rule configured in the UE during control of the QoS Rule.

QoS flow ID (QFI) (704): Identification number marked by the UPF on a DL packet in order to discriminate the QoS flow indicated by this QoS rule. When using the standard designation 5QI, the QFI may have the same value as the value of the 5QI.

QoS flow template (706): A set of packet filters applying the DL traffic during selection of the QoS flow corresponding to the QoS rule. When the QoS rule is defaulted, it may be omitted.

Precedence value (708): The order of applying this QoS rule to the DL traffic.

5G QoS characteristic indication (5QI, 710): An identifier indicating the QoS processing characteristic received when the QoS flow indicated by this QoS rule is processed in the 5G system. The 5QI may have a value designated in the standard or a value optionally selected by the SMF. With respect to the standard designated value, the 5QI may be omitted.

QoS parameters (712): Additional QoS parameter information for DRB configuration matching the QoS flow. Detailed items thereof may be a flow type (GBR (guaranteed bitrate)/non-GBR), priority, packet delay budget, packet error rate, guaranteed flow bit rate (e.g., GBR QoS flow), and maximum flow bit rate.

Transport level packet marking (714): Transport level packet marking in the downlink, e.g., DiffSery code point (DSCP), to be applied for the traffic identified for this QoS Flow, which can be the DSCP value and/or the MPLS TOS value. The transport level packet marking may be determined in consideration of the QoS characteristic, ARP, and backhaul state between the UPF and the RAN (expected congestion level and expected RTT between the UPF and the RAN).

Sixth Embodiment—Data Radio Bearer Configuration Operation in Accordance with RQ Support/Nonsupport and RQ Type of QoS Flow of RAN The RAN having received one or a plurality of QoS profiles] from one or a plurality of QoS flows transferred by a PDU session determines the number of data radio bearers (DRBs) to be used to transfer the QoS flows between the UE and the RAN and configuration of the data radio bearer (DBR).

If it is determined that it is not necessary for one or a plurality of the DL QoS flows to be transferred through a certain DRB to transfer the DL QFI and RQI with reference to the QoS profile, the RAN may determine not to use a Uu header for transfer of the QFI and the RQI during DRB configuration. In this case, such DRB configuration should be notified the UE.

Cases where it is determined not to use the Uu header for the transfer of the QFI and the RQI may be as follows.

1) When one QoS flow is transferred through a DRB, and this QoS flow does not support an RQ (i.e., RQ support element in QoS profile=nonsupport).

2) When one QoS flow is transferred through a DRB, and this QoS flow supports an RQ the type of which is RQvC (i.e., RQ support element in QoS profile=RQvC).

3) When a plurality of QoS flows transferred through a DRB do not support an RQ in all.

Seventh Embodiment—Data Packet Transfer Procedure

Figure 8:
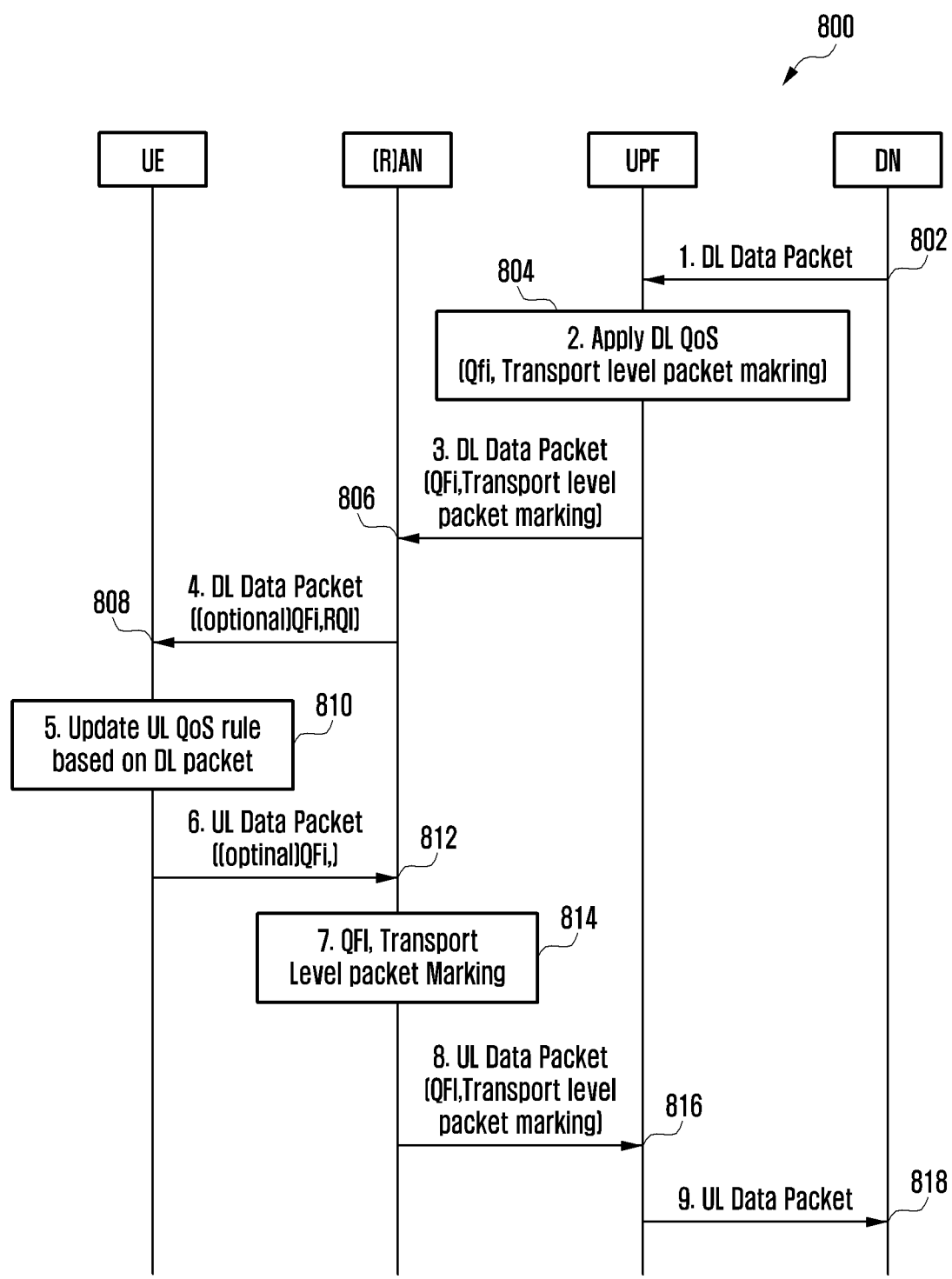
FIG. 8 is a flowchart of a method for transferring a data packet in downlink/uplink (DL/UL), according to an embodiment.

FIG. 8 is a flowchart of a method for transferring a data packet in DL/UL, according to an embodiment.

1. A UPF receives a DL data packet from a DN (802).
2. The UPF applies a QoS rule of [Fifth Embodiment] to the downlink data packet received from the DN. That is, the UPF discovers (i.e., maps) a QoS flow to be applied based on IP flow information of the received data packet. The UPF marks a mapped QoS flow id on an N3 header of the data packet. The UPF may mark the mapped RQI on the N3 header of the data packet. The UPF performs transport level packet marking (i.e., DSCP marking or MPLS marking) included in the QoS rule (804).
3. The UPF transfers the data packet to a RAN. In this case, QFI and RQI are marked on the N3 header of the data packet, and the transport level packet marking is made in an outer header (i.e., outer IP or L2 header) (806).
4. The RAN having received this applies the DRB configured through [Sixth Embodiment] in accordance with the QFI of the DL packet. That is, in accordance with the DRB application, the RAN may use or omit a Uu header for the QFI and RQI (808).
5. The UE receives the DL data packet, and performs an operation of [Eighth Embodiment] based on the received DL data packet. That is, in accordance with RQ support/nonsupport of the QoS flow and an RQ type, the UE updates UE UL QoS rule (i.e. uplink traffic flow template (UL TFT)) (adds/removes a packet filter to/from the UP TFT) (810).
6. If a UL traffic occurs, the UE performs IP flow to QoS flow mapping by applying the UL QoS rule updated in the procedure 5, and marks the QoS flow id on the Uu header or omits the marking in accordance with the UL DRB configuration. The UE transfers the UL data packet to the RAN through the Uu (812).
7. The RAN performs QFI marking and transport level packet marking on the UL N3 header in accordance with the QoS profile of [Fourth Embodiment] of the received UL packet (814).
8. The RAN transfers the UL packet to the UPF through N3 (816).
9. The UPF transfers the received UL packet to the DN (818).

Figure 9:
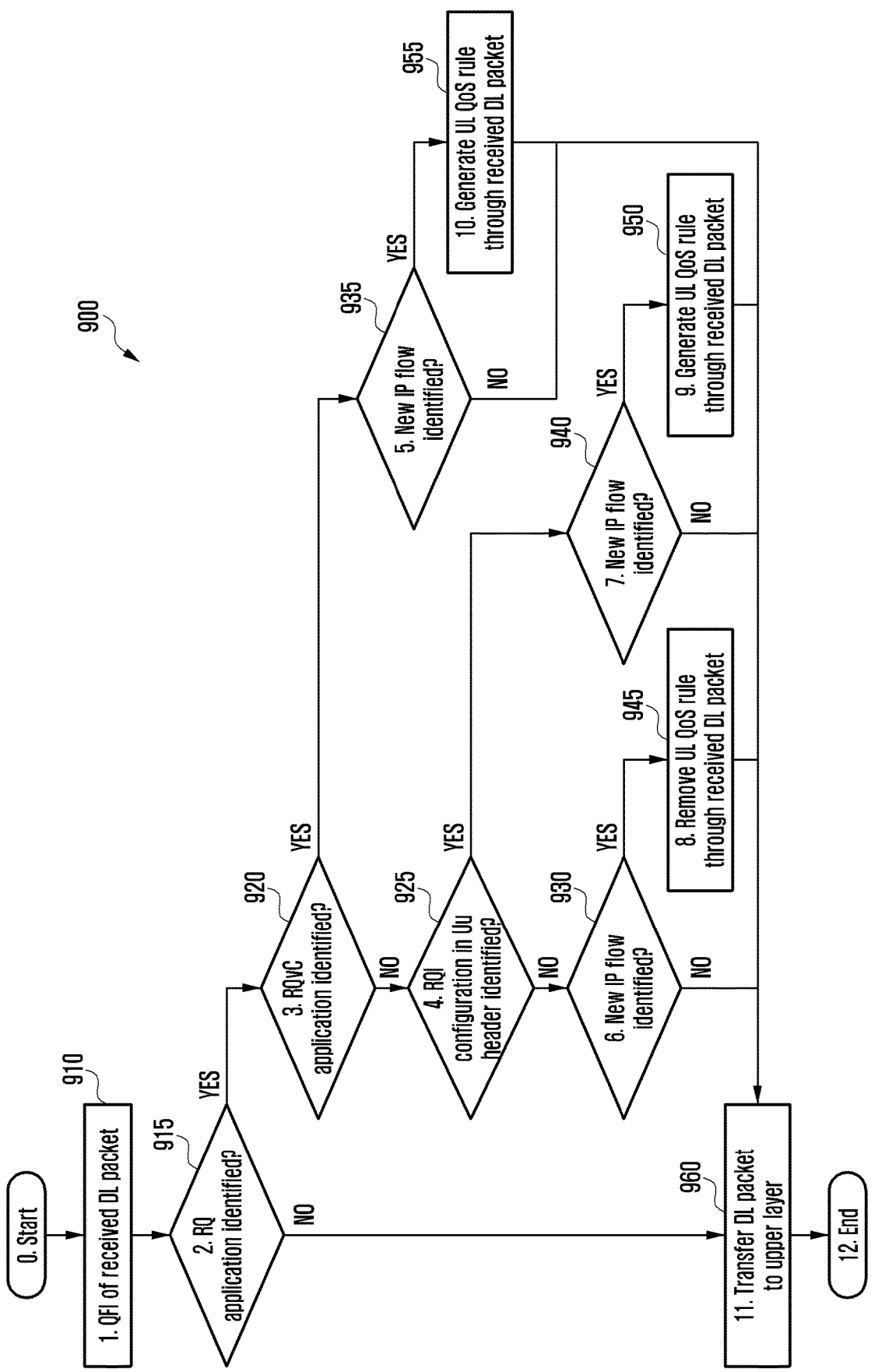
FIG. 9 is a flowchart of a DL packet processing method, according to whether a UE supports reflective QoS (RQ) of a QoS flow and an RQ type, according to an embodiment.

Eighth Embodiment—DL Packet Processing Operation in Accordance with RQ Support/Nonsupport and RQ Type of QoS Flow of UE FIG. 9 is a flowchart of a DL packet processing method according to whether a UE supports RQ of a QoS flow and an RQ type, according to an embodiment.

0. If a DL packet is received, the UE starts a DL packet processing operation.
1. The UE finds a QoS flow to which the DL packet belongs in accordance with what DRB or QFI of the Uu header of the received DL packet the DL packet is transferred through (910).
2. The UE identifies whether the QoS flow to which the DL packet identified in 1 is a QoS flow supporting the RQ with reference to a UL QoS rule of [Third Embodiment] (915).
3. In case of the RQ support/nonsupport QoS flow, it is identified whether the RQ type is RQvC or RQvU (920).
4. In case of the RQvU (if the RQ type is not RQvC), it is identified whether an RQI field is configured in the Uu header of the DL packet (925).
5. In case of the RQvC, it is identified whether an IP flow indicated by a data header (inner IP header and inner TCP or UDP header) is a new IP flow in the UL TFT of the QoS rule to which the QoS flow belongs (935).
6. If the RQ type is RQvU and the RQI is not configured, it is identified whether the IP flow indicated by the data header of the DL packet is the new IP flow in the UL TFT of the QoS rule to which the QoS flow belongs (930).
7. If the RQ type is RQvU and the RQI is configured, it is identified whether the IP flow indicated by the data header of the DL packet is the new IP flow in the UL TFT of the QoS rule to which the QoS flow belongs (940).
8. If the RQ type is RQvU, the RQI is not configured, and the IP flow is determined as the new IP flow in procedure 6, a packet filter of the IP flow called by the received DL packet is deleted from the packet filter of the QoS rule made through the existing RQ (945).
9. If the RQ type is RQvU, the RQI is not configured, and the IP flow is determined as the new IP flow in procedure 7, a packet filter of the IP flow called by the received DL packet and a UL QoS rule having the received QoS flow id are made (950).
10. If the RQ type is RQvC, and the IP flow is determined as the new IP flow in procedure 5, a packet filter of the IP flow called by the received DL packet and a UL QoS rule having the received QoS flow id are made (955).
11. The processed DL packet is transferred to an upper layer of the UE (960).
12. The procedure is ended.

The packet computation load of the UE is reduced, and the DL packet processing of the UE is performed relatively fast. Further, the use of the radio resources for the QoS support is saved, and the QoS reflecting various QoS requirements and backhaul network situations are secured in the 5G backhaul network.

Figure 10:
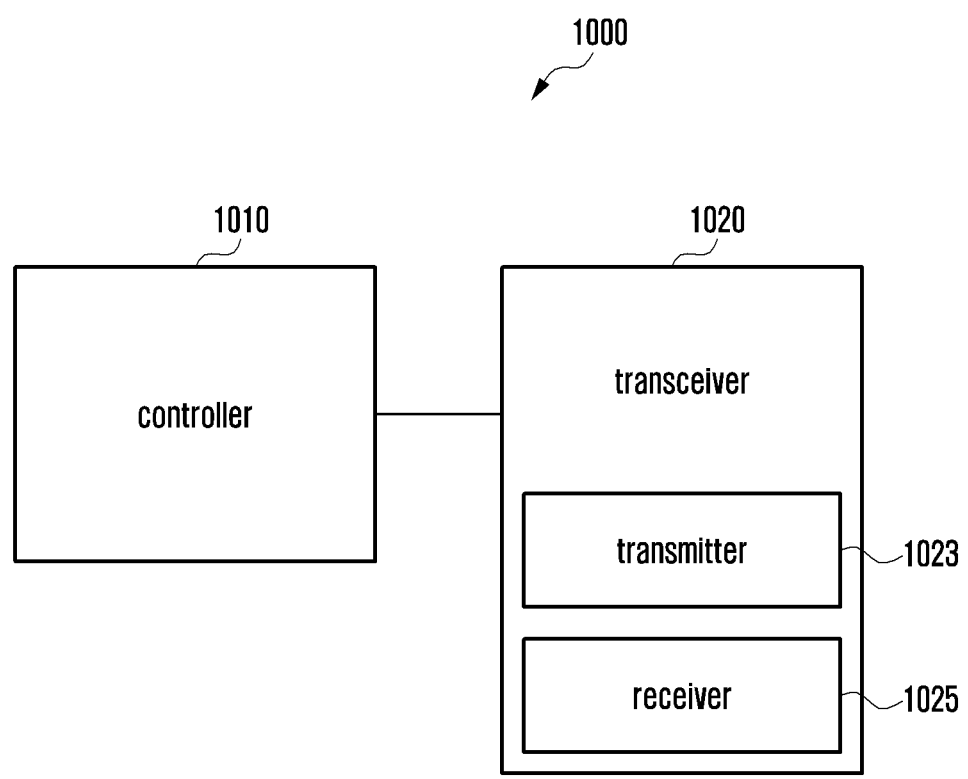
FIG. 10 is a diagram of a terminal, according to an embodiment.

FIG. 10 is a diagram of a terminal, according to an embodiment.

A terminal 1000 may be one of the aforementioned electronic devices and may include a transceiver 1020 and a controller 1010 configured to control the overall operation of the terminal 100. The transceiver 1020 may include a transmitter 1023 and a receiver 1025. The terminal may further include a storage (e.g., memory) in addition to the transceiver 1020 and the controller 1010.

The transceiver 1020 may transmit/receive signals with other network entities.

The controller 1010 may control signal flow between respective blocks to perform the above-described methods of FIGS. 3, 4, 8 and 9. The controller 1010 and the transceiver 1020 may be implemented by separate modules, or they may be implemented by one constituent unit in the form of a single chip, a system on chip, etc.

The controller 1010 and the transceiver 1020 may be electrically connected to each other. For example, the controller 1010 may be or include a circuit, an application-specific circuit, or at least one processor. Further, operations of the terminal 1000 may be implemented by providing a memory device storing corresponding program codes therein on a certain constituent unit in the terminal 1000. The terminal 1000 may also include any one of the aforementioned modules.

Figure 11:
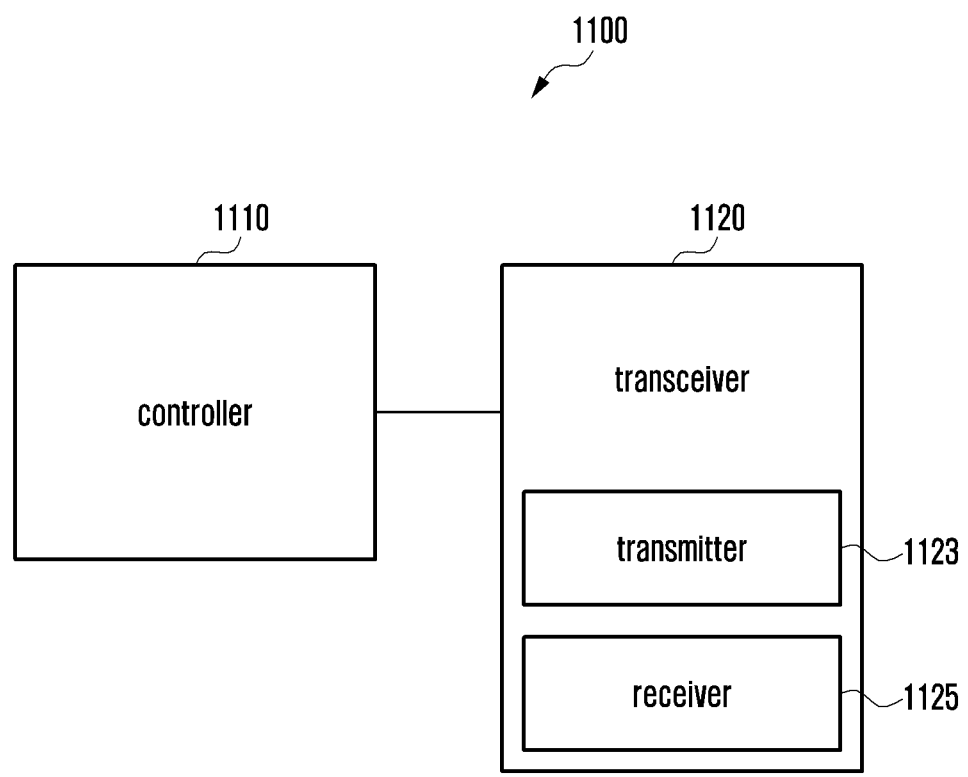
FIG. 11 is a diagram of a base station, according to an embodiment.

FIG. 11 is a diagram of a base station, according to an embodiment.

A base station 1100 may be one of the aforementioned electronic devices and may include a transceiver 1120 and a controller 1110 configured to control the overall operation of the base station 1100. The transceiver 1120 may include a transmitter 1123 and a receiver 1125. The base station 1100 may further include a storage in addition to the transceiver 1120 and the controller 1110.

The transceiver 1120 may transmit/receive signals with other network entities.

The controller 1110 may control the base station 1100 to perform any one of the methods described with respect to FIGS. 3, 4, 8, and 9.

The controller 1110 may control signal flow between respective blocks to perform the methods described with respect to FIGS. 3, 4, 8, and 9. The controller 1110 and the transceiver 1120 may not be implemented by separate modules, or they may be implemented by one constituent unit in the form of a single chip, a system on chip, etc. The controller 1110 and the transceiver 1120 may be electrically connected to each other. For example, the controller 1110 may be a circuit, an application-specific circuit, or at least one processor. The base station may be implemented by providing a memory device storing corresponding program codes therein on a certain constituent unit in the base station. The base station 1100 may also include any one of the aforementioned modules.

Figure 12:
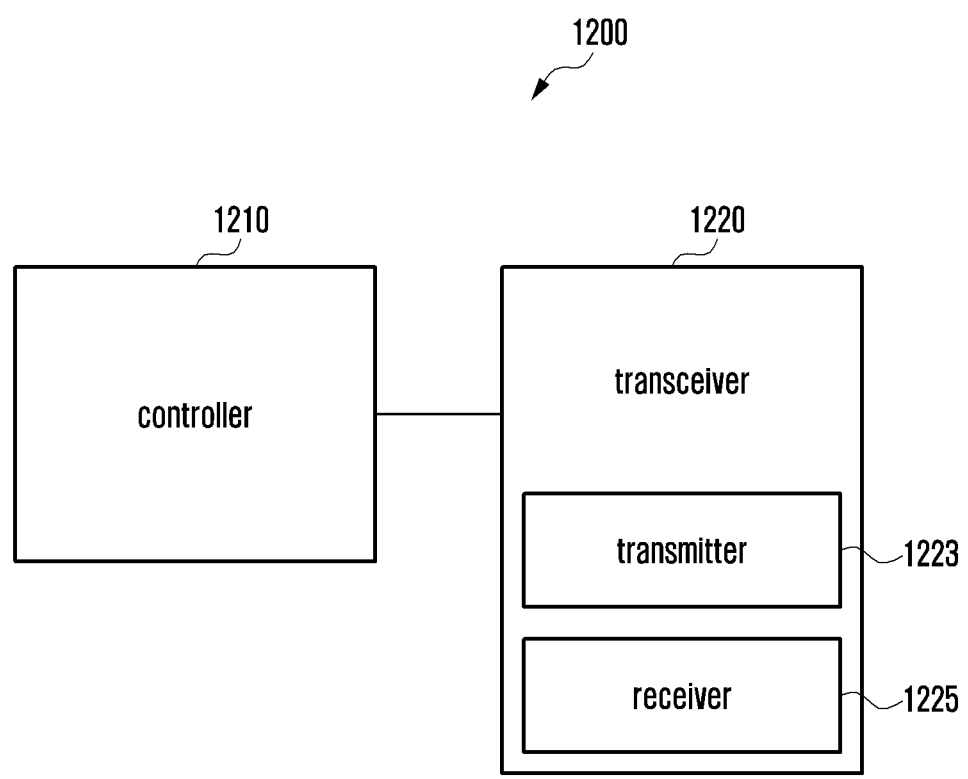
FIG. 12 is a diagram of a network entity, according to an embodiment.

FIG. 12 is a diagram of a network entity, according to an embodiment.

A network entity 1200 may include a transceiver 1220 and a controller 1210 configured to control the overall operation of the network entity 1200. The transceiver 1220 may include a transmitter 1223 and a receiver 1225. The network entity 1200 may further include a storage in addition to the transceiver 1220 and the controller 1210.

The transceiver 1220 may transmit/receive signals with other network entities.

The controller 1210 may control the network entity 1200 to perform any one of the methods described with respect to FIGS. 3, 4, 8, and 9.

The controller 1210 may control signal flow between respective blocks to perform the methods described with respect to FIGS. 3, 4, 8, and 9. The controller 1210 and the transceiver 1220 may not be implemented by separate modules, or they may be implemented by one constituent unit in the form of a single chip, a system on chip, etc. The controller 1210 and the transceiver 1220 may be electrically connected to each other. For example, the controller 1210 may be a circuit, an application-specific circuit, or at least one processor. The network entity 1200 may be implemented by providing a memory device storing corresponding program codes therein on a certain constituent unit in the base station.

In accordance with the disclosure, a packet computation load of a terminal (user equipment (UE)) can be reduced, and the use of the radio resources for the QoS support can be saved. Further, the QoS reflecting various QoS requirements and backhaul network situations can be secured in the 5G backhaul network.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a base station in a wireless communication system, the method comprising:
    receiving, from a session management function (SMF) entity, information on transport level packet marking for uplink data of a terminal, wherein the information includes a differentiated services code point (DSCP) value;
    receiving, from the terminal, the uplink data;
    performing the transport level packet marking in an internet protocol (IP) header for the uplink data based on the DSCP value received from the SMF entity; and
    transmitting, to a user plane function (UPF) entity, the uplink data with the IP header.

2. The method of claim 1, wherein the transport level packet marking is performed on a per quality of service (QoS) flow basis.

3. The method of claim 1, wherein the uplink data is transmitted to the UPF entity over an N3 tunnel.

4. A method performed by a user plane function (UPF) entity in a wireless communication system, the method comprising:
    receiving, from a session management function (SMF) entity, information on transport level packet marking for downlink data for a terminal wherein the information includes a differentiated services code point (DSCP) value;
    performing the transport level packet marking in an internet protocol (IP) header for the downlink data based on the DSCP value received from the SMF entity; and
    transmitting, to a base station, the downlink data with the IP header.

5. The method of claim 4, wherein the transport level packet marking is performed on a per quality of service (QoS) flow basis.

6. The method of claim 4, wherein the downlink data is transmitted to the base station in a tunnel between the UPF entity and the base station.

7. A base station in a wireless communication system, the base station comprising:
    a transceiver; and
    a controller coupled with the transceiver and configured to:
        receive, from a session management function (SMF) entity, information on transport level packet marking for uplink data of a terminal, wherein the information includes a differentiated services code point (DSCP) value,
        receive, from the terminal, the uplink data,
        perform the transport level packet marking in an internet protocol (IP) header for the uplink data based on the DSCP value received from the SMF entity, and
        transmit, to a user plane function (UPF) entity, the uplink data with the IP header.

8. The base station of claim 7, wherein the transport level packet marking is performed on a per quality of service (QoS) flow basis.

9. The base station of claim 7, wherein the uplink data is transmitted to the UPF entity over an N3 tunnel.

10. A user plane function (UPF) entity in a wireless communication system, the UPF entity comprising:
    a transceiver; and a controller coupled with the transceiver and configured to:
    receive, from a session management function (SMF) entity, information on transport level packet marking for downlink data for a terminal, wherein the information includes a differentiated services code point (DSCP) value,
  perform the transport level packet marking in an internet protocol (IP) header for the downlink data based on the DSCP value received from th SMF entity, and
  transmit, to a base station, the downlink data with the IP Header.

11. The UPF entity of claim 10, wherein the transport level packet marking is performed on a per quality of service (QoS) flow basis.

12. The UPF entity of claim 10, wherein the downlink data is transmitted to the base station in a tunnel between the UPF entity and the base station.

13. A method performed by a terminal in a wireless communication system, the method comprising:
  generating uplink data of the terminal; and
  transmitting, to a base station, the uplink data,
  wherein information on transport level packet marking for the uplink data is received by the base station from a session management function (SMF) entity,
  wherein the transport level packet marking is performed by the base station in an internet protocol (IP) header for the uplink data based on the DSCP value received from the SMF entity, and
  wherein the uplink data with the IP header is transmitted by the base station to a user plane function (UPF) entity.

14. The method of claim 13, wherein the transport level packet marking is performed on a per quality of service (QoS) flow basis.

15. The method of claim 13, wherein the uplink data is transmitted to the UPF entity over an N3 tunnel.

16. A terminal in a wireless communication system, the terminal comprising:
  a transceiver; and
  a controller coupled with the transceiver and configured to:
    generate uplink data of the terminal, and
    transmit, to a base station, the uplink data,
  wherein information on transport level packet marking for the uplink data is received by the base station from a session management function (SMF) entity,
  wherein the transport level packet marking is performed by the base station in an internet protocol (IP) header for the uplink data based on the DSCP value received from the SMF entity, and
  wherein the uplink data with the IP header is transmitted by the base station to a user plane function (UPF) entity.

17. The terminal of claim 16, wherein the transport level packet marking is performed on a per quality of service (QoS) flow basis.

18. The terminal of claim 16, wherein the uplink data is transmitted to the UPF entity over an N3 tunnel.

* * * * *